Patented Dec. 24, 1946

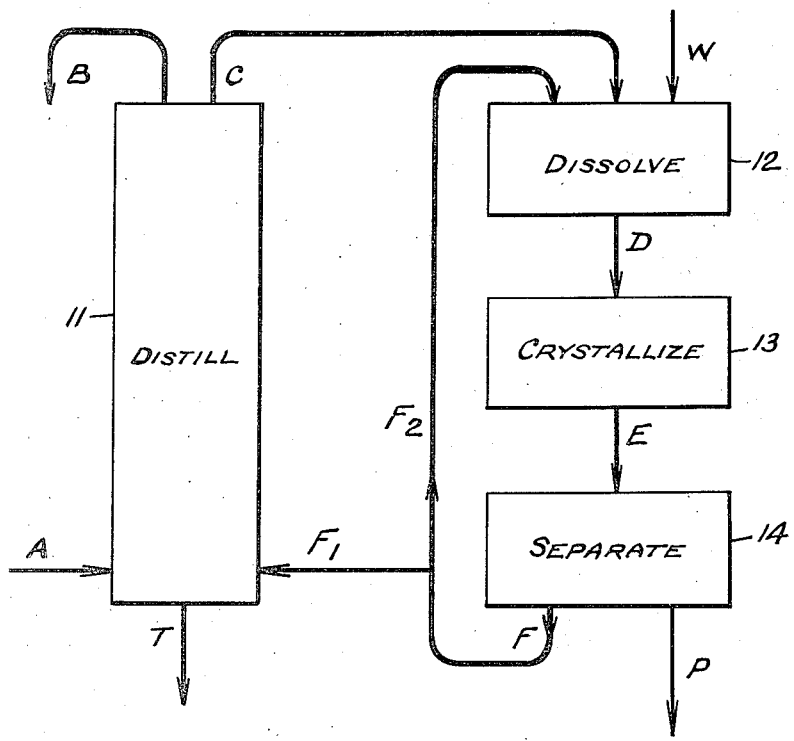

2,413,235

UNITED STATES PATENT OFFICE 2,413,235

CROTONIC ACID MANUFACTURE

Douglas Joseph Kennedy, Shawinigan Falls, Quebec, Canada, assignor to Shawinigan Chemicals Limited, Montreal, Quebec, Canada, a corporation of Canada Application February 17, 1945, Serial No. 578,559
In Canada February 2, 1945

4 Claims. (Cl. 260—530)

This invention relates to a process for obtaining crotonic acid in a substantially pure form and in good yield from a crude product resulting from the oxidation of crotonaldehyde.

The crude product which is treated according to the present invention generally contains unchanged crotonaldehyde, crotonic anhydride, an oxidation catalyst, an organic diluent, water and oxidation by-products in addition to crotonic acid. The diluent may be an organic acid, particularly acetic acid—an ester, particularly methyl or ethyl acetate—a ketone, particularly acetone or methyl ethyl ketone—or a hydrocarbon, particularly benzene or toluene.

The catalyst may be selected from the usual aldehyde oxidation catalysts, particularly manganese acetate, cobalt acetate, copper acetate, the crotonates of these metals, and other organic salts of these metals. I prefer to use a mixture of cobalt and copper salts, particularly the acetates. The concentration of catalyst may vary from about one-fiftieth of one percent to about two percent by weight on the total charge, a preferred range being from about one-half percent to about one percent. Where the catalyst is a mixture of copper acetate and cobalt acetate, it is preferable that the cobalt acetate be present to the extent of about 15% or less on the copper acetate but not less than about one-fiftieth percent by weight of the total charge. In the case of mixtures of other organic salts of these metals, the amounts will be of a similar order. The invention is especially applicable to purifying the crude products resulting from the oxidation of crotonaldehyde described in copending application Serial Number 578,558, filed February 17, 1945. The invention is, however, not limited to the treatment of such products and is generally applicable to the crude products resulting from the oxidation of crotonaldehyde in the presence of diluents which are inert organic liquids, which are solvents for dry and/or water-saturated crotonaldehyde, which are also solvents for the oxidation products of crotonaldehyde and which are chemically inert under reaction conditions.

According to a preferred procedure which can advantageously be illustrated by the accompanying drawing in the form of a flow-sheet, the crude product A is subjected to either batch or continuous distillation at atmospheric or sub-atmospheric pressure, as for instance in a vessel 11. The distillation product C is a crude crotonic acid, which, although having a high crotonic acid content contains also isocrotonic acid and colour-imparting impurities. Unoxidized crotonaldehyde, diluents, water, and low-boiling oxidation by-products are removed from the system as at B. High-boiling oxidation by-products, crotonic anhydride, if any, and the catalysts are removed from the system as at T.

This distillation product is dissolved in water, represented by W, as for instance in a vessel 12, to give an essentially saturated solution at a temperature from about 35° C. to about 40° C. or preferably from about 37° C. to about 40° C. The solution, represented by D, is then cooled, for instance, in a vessel 13, from about 5° C. to about 30° C. preferably from about 15° C. to about 25° C. Crotonic acid crystals are thrown out of solution in good yield, after which the mixture of crystals and mother liquor E, is passed to a separation step. The crystals, represented by D, are separated from the mother liquor by centrifugal action, filtration, or other suitable means, represented by 14. F2 a portion of the mother liquor F is then resaturated with crude crotonic acid in the vessel 12 at a temperature of about 35° C. to about 40° C. preferably from about 37° C. to about 40° C. and the dissolving-crystallizing-separating cycle repeated.

In order to reduce the accumulation of isocrotonic acid and other impurities in the mother liquor, a portion F1 of the mother liquor is withdrawn from the crystallization system during each cycle and replaced with an equal volume of fresh water W. This fresh water may be added most advantageously as a wash water for the separated crotonic acid crystals P. The portion F1 of the mother liquor withdrawn from the crystallization system is added to the original crude oxidation product, as for instance in the vessel 11, either before or during distillation.

It should also be explained that isocrotonic acid, a cis-isomer of crotonic acid is partially converted to crotonic acid at the temperature of distillation so that the crude crotonic acid obtained from the distillation will not contain more than the equilibrium amount of isocrotonic acid.

EXAMPLES

In order to describe the process more fully the following examples are given. The data given should, of course, be considered as illustrative and not in a limiting sense.

EXAMPLE 1

A solution of 150 parts of water-saturated crotonaldehyde in 240 parts of acetone containing 2 parts of manganese acetate was oxidized with oxygen at 25° C. until the reaction had slowed appreciably. Examination of the solution showed that about 86.2% by weight of the crotonaldehyde had been consumed and of the amount consumed about 58.9%, was recovered by distillation as crotonic acid.

EXAMPLE 2

A solution of 226 parts of water-saturated crotonaldehyde in 245 parts of methyl acetate containing 2.7 parts of copper acetate and 0.45 part of cobalt acetate when oxidized at 30° C. as in the above examples gave a crotonaldehyde consumption of 85.9%, of which 69.4% was recovered as crotonic acid.

EXAMPLE 3

A solution of 226 parts of dry crotonaldehyde in 229 parts of benzene containing 2.7 parts of copper acetate and 0.45 part of cobalt acetate when oxidized at 30° C. as in the above examples gave a crotonaldehyde consumption of 84%, of which 63% was recovered as crotonic acid.

EXAMPLE 4

A solution of 226 parts of water-saturated crotonaldehyde in 276 parts of acetic acid containing 2.7 parts of copper acetate and 0.45 part of cobalt acetate was oxidized at 30° C. with oxygen until the reaction had slowed appreciably. Examination of the solution showed that 67% of the crotonaldehyde has been consumed, and of the amount consumed, 51.2% was recovered as crotonic acid.

EXAMPLE 5

The crotonic acid prepared as in any of the above examples and containing impurities which depress its melting point to about 63° C. to 65° C. was crystallized from a saturated aqueous solution at from about 35° C. to about 40° C. and then had a melting point of about 72° C.

ADVANTAGES

From the foregoing, it will be readily seen that the invention fulfills the important object of providing a process for the isolation of pure crotonic acid from crotonaldehyde oxidation mixtures and having inherent advantages which will be apparent to those skilled in the art.

It will be understood that, without departing from the spirit of the invention or the scope of the claims, various modifications may be made in the specific expedients described. The latter are illustrative only and not offered in a restrictive sense, it being desired that only such limitations shall be placed thereon as may be required by the state of the prior art.

The sub-titles used throughout the specification are merely to simplify reference thereto and should otherwise be disregarded.

I claim:

1. A process for the recovery of crotonic acid from a crude product, resulting from the oxidation of crotonaldehyde, containing crotonic acid, crotonic anhydride, crotonaldehyde, an oxidation catalyst, and oxidation by-products, comprising, distilling in a distillation step said mixture to obtain a fraction containing crotonic acid, isocrotonic acid and impurities, dissolving a portion of said fraction in hot water to give an essentially saturated solution, cooling the solution to precipitate crystals of pure crotonic acid from the mother liquor, separating the crystals from the mother liquor, saturating a portion of the mother liquor with a further portion of said fraction, and repeating the dissolving-crystallizing-separating cycle, returning the balance of the said mother liquor to said distillation step, and replacing said balance of the mother liquor with water in the said dissolving-crystallizing-separating cycle thereby reducing the accumulation of isocrotonic acid and other impurities in the mother liquor.

2. A process, according to claim 1, wherein said saturated solution is at a temperature within the range from about 35° C. to about 40° C. and said solution is cooled to a temperature within the range from about 5° C. to about 30° C.

3. A process, according to claim 1, wherein said crude product contains at least 10% by volume of an organic diluent.

4. A process, according to claim 1, wherein said crude product contains at least 10% by volume of an organic diluent, and wherein said saturated solution is at a temperature within the range from about 35° C. to about 40° C. and said solution is cooled to a temperature within the range from about 5° C. to about 30° C.

DOUGLAS JOSEPH KENNEDY.